United States Patent [19]
Cooley

[11] 3,816,814
[45] June 11, 1974

[54] MAGNETIC PHASE DIFFERENCE METER
[76] Inventor: Charles O. Cooley, Rt. 2, Box 147, Alvin, Tex. 77511
[22] Filed: Apr. 2, 1973
[21] Appl. No.: 347,154

[52] U.S. Cl................ 324/83 A, 318/191, 324/87
[51] Int. Cl..................... G01r 25/00, H03d 13/00
[58] Field of Search........ 324/87, 83 R, 83; 318/45, 318/191

[56] References Cited
UNITED STATES PATENTS
701,886   6/1902   Huthsteiner.................. 324/87
2,349,663 5/1944   Langer...................... 324/83 A
2,993,170 7/1961   Smith........................ 324/87
3,217,252 11/1965  Povey et al................. 324/83 A
3,333,173 7/1967   Purrwachter................. 318/191

*Primary Examiner*—Alfred E. Smith
*Attorney, Agent, or Firm*—Robert W. B. Dickerson

[57] ABSTRACT

Circuitry for determining any magnetic phase difference, and direction of such difference, between coupled induction motors.

4 Claims, 2 Drawing Figures

3,816,814

MAGNETIC PHASE DIFFERENCE METER

BACKGROUND OF THE INVENTION

Induction motors of the type of concern herein, have alternating current supplied to the stator directly, and to the rotor by induction or transformer action. When such motors are coupled, ie., linked for joint use, the respective stators will draw the same current, and therefore share an equivalent load, so long as they are in phase i.e., their magnetic fields rotating in unison. On their becoming out of phase, one will draw more current, and thereby become over loaded. This may result in excessive wear, and unnecessary shut down time. The determination of such phase difference, and the providing of an indication thereof, is the problem area to which this invention is directed. A prior art search revealed the following pertinent U.S. Pat. Nos. : 3,683,199; 3,401,308; 3,590,324; 3,242,383; 2,484,374; 3,536,968; 3,611,080; 3,333,173; and 3,688,167.

SUMMARY OF THE INVENTION

Current transformers are inserted in a common leg connecting the common power supply to each of coupled motors. The transformer secondary winding leads are each connected across a bridge circuit. The respective bridges are coupled, a voltmeter being provided therebetween for providing a quantitative indication of magnetic phase difference or separation, and the direction thereof.

DESCRIPTION OF THE INVENTION

Figure 1:
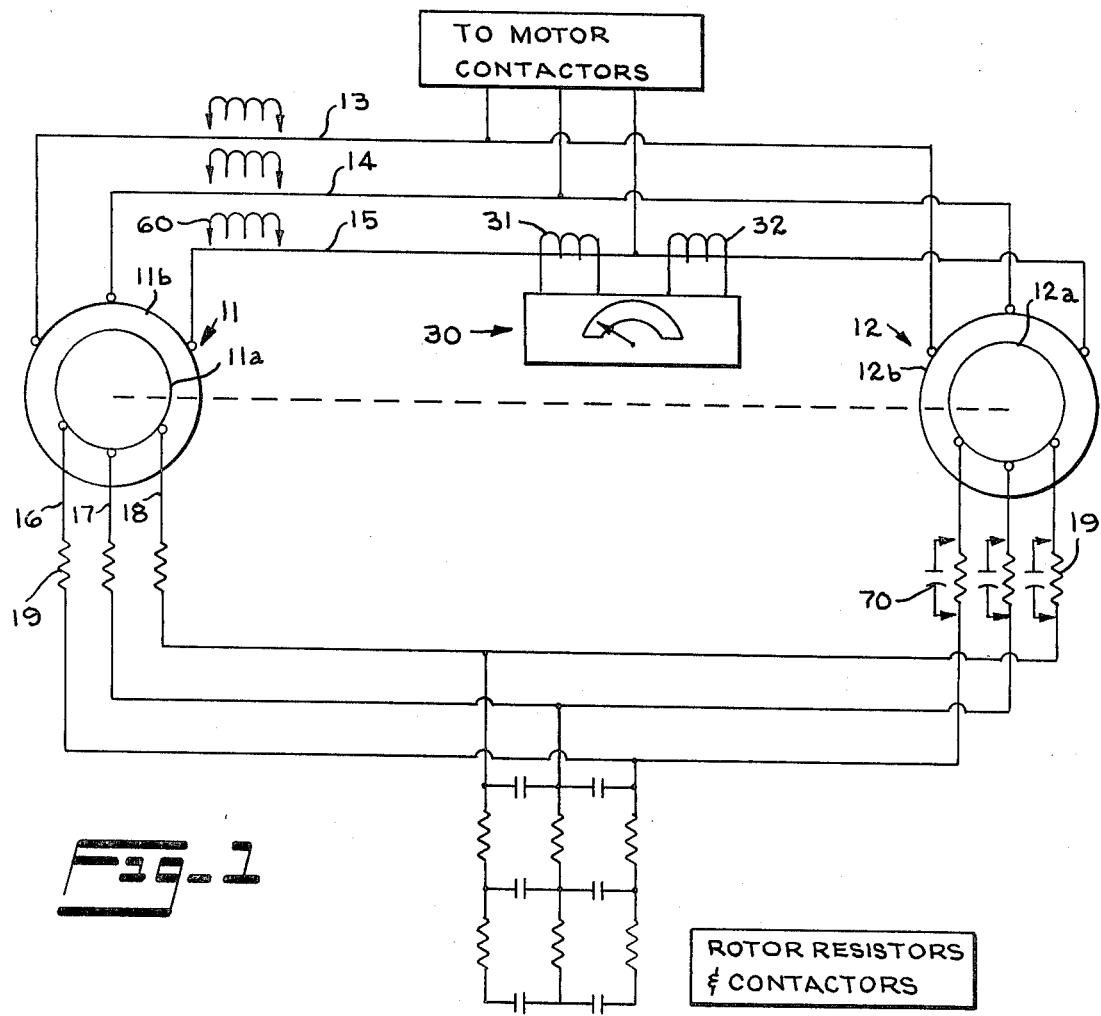
FIG. 1 is a schematic diagram of the coupled motors, with the magnetic phase difference meter being illustrated generally.

FIG. 1 illustrates, schematically, a pair of mechanically coupled induction motors 11 and 12. Each motor includes wound rotor 11A and 12A. A common outside source of power, not shown, would provide polyphase power through motor contactors to the respective stators, 11B and 12B, by common leads 13, 14 and 15. Rotors 11A and 12A may be coupled by conductors 16, 17 and 18, they each including buffer resistors 19 within their path. The magnetic phase difference meter 30, is illustrated generally as including a pair of current transformers 31, 32, sampling the current in one lead, such as 15, going to each stator.

Figure 2:
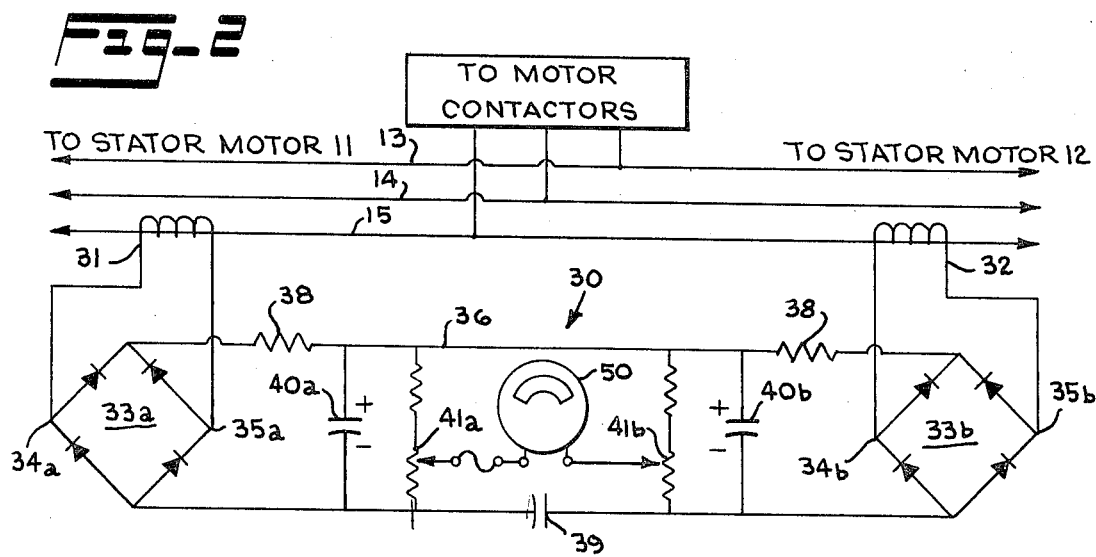
FIG. 2 is a schematic of the magnetic phase difference meter.

Moving now to FIG. 2, the secondary windings of transformers 31 and 32 are connected across bridges 33A and 33B respectively, at junctions 34A, 35A and 34B, 35B. Bridges 33A and 33B are coupled by parallel leads 36 and 37, the former including resistances 38 therein, and the latter including capacitor 39. Connected across leads 36, 37, are capacitors 40A and 40B, and resistances 41A and 41B. Connected across resistance leads 41A and 41B is Center reading voltmeter 50.

Consider the circuit now under operating conditions. Polyphase source current would pass through leads 13, 14 and 15 to the stators of motors 11 and 12. When these coupled motors are in phase, they will draw the same current. The sampled a-c current, as induced by transformers 31 and 32, and and rectified by bridges 33A and 33B, would result in equal voltage drops between leads 36 and 37, across leads 41a, 41b ie., the needle of voltmeter 50 would be centered and constant. Assume now that the current to motor 11 is greater than that to 12. This would be caused by motor 11 carrying more than its share of the load, and the magnetic field of 11 leading 12. This would cause the needle of voltmeter 30 to swing to the left, as seen in FIG. 2.

Corrections may be made by adding inductance, such as at 60 in the circuit of motor 11, to introduce a lagging time factor, or by introducing capacitance, such as at 70, to introduce a leading time factor.

It should be noted that a time lag is included in the meter circuitry, in the form of capacitors 40A and 40B. Thus, when the motors are turned on or off rapidly, the voltmeter may hold its reading for a sufficient time to allow a reading.

In summation, then, circuitry and instrumentation is provided for determining the direction and magnitude of any magnetic phase difference between coupled induction motors. Although only a single embodiment has been described, it should be obvious that numerous embodiments would be possible by one skilled in the art without departing from the spirit of the invention, the scope of which is intended to be limited only by the following claims:

I claim:

1. In a circuit for determining phase difference between rotating magnetic fields of coupled induction motors, said motors receiving power from a common supply, the combination of:
   - transformer coils for each of said motors so positionable as to sample current in a common line from said common supply to the stator of each of said motors;
   - each of said coils being connected across a bridge, said bridge including means for rectifying said sampled currents;
   - parallel conduits coupling each of said bridges;
   - parallel resistance leads, connecting said conduits and shunted across said bridges; and
   - means for measuring and visually indicating voltage drop positioned intermediate said resistance leads, and connected thereto.

2. The circuit of claim 1 wherein said measuring and indicating means includes a volt meter.

3. The circuit of claim 2 and including means for holding the reading of said voltmeter after power is removed from said motors.

4. The circuit of claim 1 and including a plurality of capacitor-containing leads connecting said parallel conduits, said capacitor-containing leads being disposed on opposite sides of said measuring means.

* * * * *